(12) United States Patent
Parison et al.

(10) Patent No.: US 7,654,540 B2
(45) Date of Patent: Feb. 2, 2010

(54) ELECTROMECHANICAL TRANSDUCING

(75) Inventors: James A. Parison, New Ipswich, NH (US); Jack Breen, Southborough, MA (US)

(73) Assignee: Bose Corporation, Framingham, MA (US)

( * ) Notice: Subject to any disclaimer, the term of this patent is extended or adjusted under 35 U.S.C. 154(b) by 241 days.

(21) Appl. No.: 10/871,230

(22) Filed: Jun. 18, 2004

(65) Prior Publication Data
US 2005/0280218 A1 Dec. 22, 2005

(51) Int. Cl.
*B60G 17/015* (2006.01)
(52) U.S. Cl. .................. 280/5.5; 280/5.508; 280/5.514; 280/5.515; 310/12.04; 310/12.32; 310/12.01
(58) Field of Classification Search .................. 310/12, 310/13, 14, 15; 335/229, 230, 232, 279; 280/5.5, 5.508, 5.514, 5.515
See application file for complete search history.

(56) References Cited

U.S. PATENT DOCUMENTS

| | | | |
|---|---|---|---|
| 3,113,807 A | 12/1963 | Polidor | |
| 3,778,121 A | 12/1973 | Levesque | |
| 4,697,113 A * | 9/1987 | Young | 310/15 |
| 4,704,553 A * | 11/1987 | Resnicow | 310/12 |
| 4,859,974 A | 8/1989 | Kliman et al. | |
| 4,892,328 A | 1/1990 | Kurtzman et al. | |
| 4,981,309 A | 1/1991 | Froeschle et al. | |
| 5,072,144 A * | 12/1991 | Saito et al. | 310/12 |
| 5,225,725 A * | 7/1993 | Shiraki et al. | 310/12 |
| 5,717,261 A * | 2/1998 | Tozoni | 310/12 |
| 5,763,965 A | 6/1998 | Bader | |
| 5,896,076 A * | 4/1999 | van Namen | 335/229 |
| 5,959,374 A * | 9/1999 | Anderson et al. | 310/13 |
| 6,326,708 B1 * | 12/2001 | Tsuboi et al. | 310/12 |
| 6,354,607 B1 | 3/2002 | Kawashima | |
| 6,891,285 B2 * | 5/2005 | Harned et al. | 310/12 |
| 2001/0048249 A1 * | 12/2001 | Tsuboi et al. | 310/12 |
| 2002/0018195 A1 * | 2/2002 | Iwamoto et al. | 355/72 |
| 2002/0089237 A1 * | 7/2002 | Hazelton | 310/12 |
| 2003/0011254 A1 * | 1/2003 | Ukaji | 310/64 |

FOREIGN PATENT DOCUMENTS

| | | |
|---|---|---|
| DE | 203 16 493 | 2/2004 |
| EP | DE 203 16 493 | 12/2003 |
| EP | DE 20316493 | 12/2003 |
| WO | WO 02/087061 | 10/2002 |

OTHER PUBLICATIONS

European Search Report issued on May 25, 2007, in European Application No. 05104881.7, filed June. 3, 2005.
Office Action dated Jun. 27, 2008 from China Application No. 200510078397.7.
Translation of Office Action dated Mar. 13, 2009, in counterpart Chinese Application No. 200510078397.7.
Translation of Office Action dated Jul. 24, 2009, in counterpart Chinese Application No. 200510078397.7.

* cited by examiner

*Primary Examiner*—Paul N. Dickson
*Assistant Examiner*—George D. Spisich
(74) *Attorney, Agent, or Firm*—Fish & Richardson P.C.

(57) ABSTRACT

An electromagnetic transducer including a stator and an armature, the armature defining a first axis and being driven to ride between first and second couplers back and forth relative to the stator along the first axis. The second coupler is configured to permit movement of the armature along a second axis orthogonal to the first axis.

11 Claims, 12 Drawing Sheets

ELECTROMECHANICAL TRANSDUCING

TECHNICAL FIELD

This description relates to electromechanical transducing.

BACKGROUND

The present invention relates in general to electromechanical transducing along a path and more particularly concerns an along-path, typically linear, controllable force source for actively absorbing energy from or applying energy to a vehicle wheel support assembly moving over a rough surface so as to facilitate significantly reducing forces transmitted to the vehicle body supported on the wheel support assembly.

Electromechanical transducing may be used, for example, in vehicle suspensions. Vehicle suspensions employ a spring and shock absorber to isolate wheel motion from body motion. Some suspensions are variable and adaptive to driving conditions. For example, it is known to use electrically controlled active suspension members, such as an hydraulic piston actuator containing gas or fluid having a pressure that can be electrically controlled, to achieve a predetermined characteristic, such as a hard or soft ride, while avoiding bottoming.

An electromagnetic transducer, such as a linear actuator, can be used in place of or in combination with the springs and/or shock absorbers and can include an armature mounted within a stator as described in U.S. Pat. No. 4,981,309 and incorporated here by reference. The armature can include bearing rails that slide within bearing trucks attached to the stator.

SUMMARY

According to a first aspect, the invention features an apparatus including an electromagnetic transducer having a stator and an armature which defines a first axis. The armature is driven to ride between first and second couplers back and forth relative to the stator along the first axis. The second coupler is configured to permit movement of the armature along a second axis orthogonal to the first axis.

In various embodiments, the apparatus includes an outer case having first and second portions. The armature can include first and second ends and configured to be slidably disposed within the case along the first axis.

In one example, the first coupler is configured to couple the first end of the armature with the first portion of the case and the second coupler is configured to couple the second end of the armature with the second portion of the case. In another example, the second coupler is configured to impart high stiffness to the armature along a third axis orthogonal to both the first axis and the second axis.

The first coupler can include a first linear bearing rail attached to a first end of the armature and a first bearing truck affixed to a first portion of the case. The first coupler can include a first linear bearing rail attached to a first portion of the case and a first bearing truck affixed to a first end of the armature.

In various applications, the first bearing rail is slideably disposed in the first bearing truck. The first bearing truck can be aligned with the first end of the armature along a surface substantially parallel to the first axis. The second coupler can include a second linear bearing rail attached to the second end of the armature, and a second bearing truck disposed within the second portion of the case. In one application, the second bearing truck slideably engages the second portion of the case along the second axis.

In one example, the apparatus includes set screws which extend from one or more of the bearing trucks and ride within slots disposed along the case to guide the movement of the armature. In another example, the second bearing truck slideably engages a recess disposed in the second portion of the case along the second axis for movement of the second end of the armature along the second axis.

The second coupler can also include roller bearings positioned between the bearing surface and the bearing pockets for slideable engagement of the second end of the armature within the second portion of the case along the second axis. In one application, the second coupler includes roller bearings positioned between the bearing surface and the bearing pockets for rollable engagement of the second end of the armature within the second portion of the case along the first axis. In one example, the second end of the armature includes a bearing surface to engage a bearing pocket disposed within the second portion of the case.

In one application, the apparatus includes roller bearings positioned between one or more of the ends of the armature and the case. The couplers can be low-friction blocks, such as delryn retainers for example, positioned between at least one of the ends of the armature and the case.

In one example, the apparatus also includes a third coupler affixed to the second portion of the case. The third coupler can include a third bearing truck slideably coupled to the second bearing rail. The third coupler can also include a surface substantially parallel to the first axis to provide substantial alignment to the second coupler. In one application, the third coupler includes at least one recess disposed along the second portion of the case.

In one application, the apparatus includes a first biasing element and a second biasing element extending from the second end of the armature to the second portion of the case. The first element can be configured to provide a first stiffness along a third axis orthogonal to the first axis and the second axis and the second element can be configured to provide a second stiffness along the second axis. In various examples, the first biasing element and the second biasing element can include a spring, a magnet, and/or an air bearing.

According to another aspect, the invention features a vehicle having an active suspension system, a chassis and at least one wheel assembly. The wheel assembly includes at least one of the apparatus described in the first aspect to providing a controllable force between the wheel assembly and the chassis. The apparatus is configured such that the first coupler of the armature substantially faces the front of the vehicle and the second coupler substantially faces the rear of the vehicle.

According to another aspect, the invention features a vehicle having an active suspension system, a chassis and at least one wheel assembly, and including at least one of the apparatus described in the first aspect for providing a controllable force between the wheel assembly and the chassis. The apparatus is configured such that the asymmetry in the load capacity of the couplers matches the asymmetry in the applied loads of the vehicle.

According to another aspect, the invention features a vehicle having an active suspension system and including a chassis, at least one wheel assembly, and at least one of the apparatus described in the first aspect for providing a controllable force between the wheel assembly and the chassis. According to another aspect, the invention features a vehicle having an active suspension system and including a chassis, and at least two wheel assemblies, and each wheel assembly having at least one of the apparatus according to the first aspect for providing a controllable force between the wheel assembly and the chassis.

According to another aspect, the invention features an electromechanical transducer including an outer case having a first portion and a second portion and housing a stator. The elongate armature extends along a first axis includes a first end and a second end and is configured to be slidably disposed within the case along the first axis. The transducer includes a first coupler to couple the first end of the armature with the first portion of the case and a second coupler to couple the second end of the armature with the second portion of the case. The second coupler is configured to allow controlled movement between the armature and the case along a second axis orthogonal to the first axis.

According to another aspect, the invention features an electromechanical transducer including a case having a first portion and a second portion and an elongate armature which extends along a first axis. The armature is slidably disposed within the case along the first axis and along first and second bearing assemblies. The bearing assemblies are configured to include first and second linear bearing rails attached to first and second ends of the armature, respectively, and first and second bearing trucks attached to first and second portions of the case, the first and second bearing trucks configured to engage the first and second linear bearings, respectively. The second bearing assembly is configured to allow controlled movement between the second linear bearing rail and the second bearing truck along a second axis orthogonal to the first axis.

According to another aspect, the invention features an active suspension system for a vehicle, where the system includes an electromechanical actuator. The actuator includes an outer case having a first portion and a second portion, an elongate armature extending along a first axis, having a first end and a second end and configured to be slidably disposed along the first axis, a first coupler to couple the first end of the armature with the first portion of the case and a second coupler to couple the second end of the armature with the second portion of the case. The second coupler is configured to allow controlled movement between the armature and the case along a second axis orthogonal to the first axis.

According to another aspect, the invention features a method of controlling an electromechanical transducer including driving an elongate armature which defines a first axis between a pair of couplers back and forth along the first axis and configuring the armature and the couplers to permit movement of the armature along a second axis orthogonal to the first axis.

According to another aspect, the invention features an apparatus having an electromagnetic transducer including a stator and an armature which defines a first axis. The armature is driven to ride between a pair of couplers back and forth relative to the stator along the first axis. Both the armature and the couplers are configured to provide a controlled amount of force in the armature along a second axis orthogonal to the first axis. In one application, the armature and the couplers are configured to provide a controlled amount of tension in the armature along the second axis. In another application, the armature and the couplers are configured to provide a controlled amount of compression in the armature along the second axis.

According to another aspect, the invention features a method of controlling an electromechanical transducer including driving an elongate armature which defines a first axis between a pair of couplers back and forth along the first axis and configuring the armature and the couplers to provide a controlled amount of force in the armature along a second axis orthogonal to the first axis. In one application, the controlled amount of force provides a controlled amount of tension in the armature along the second axis. In another application, the controlled amount of force provides a controlled amount of compression in the armature along the second axis.

Other advantages and features will become apparent from the description and from the claims.

DESCRIPTION

Figure 1:
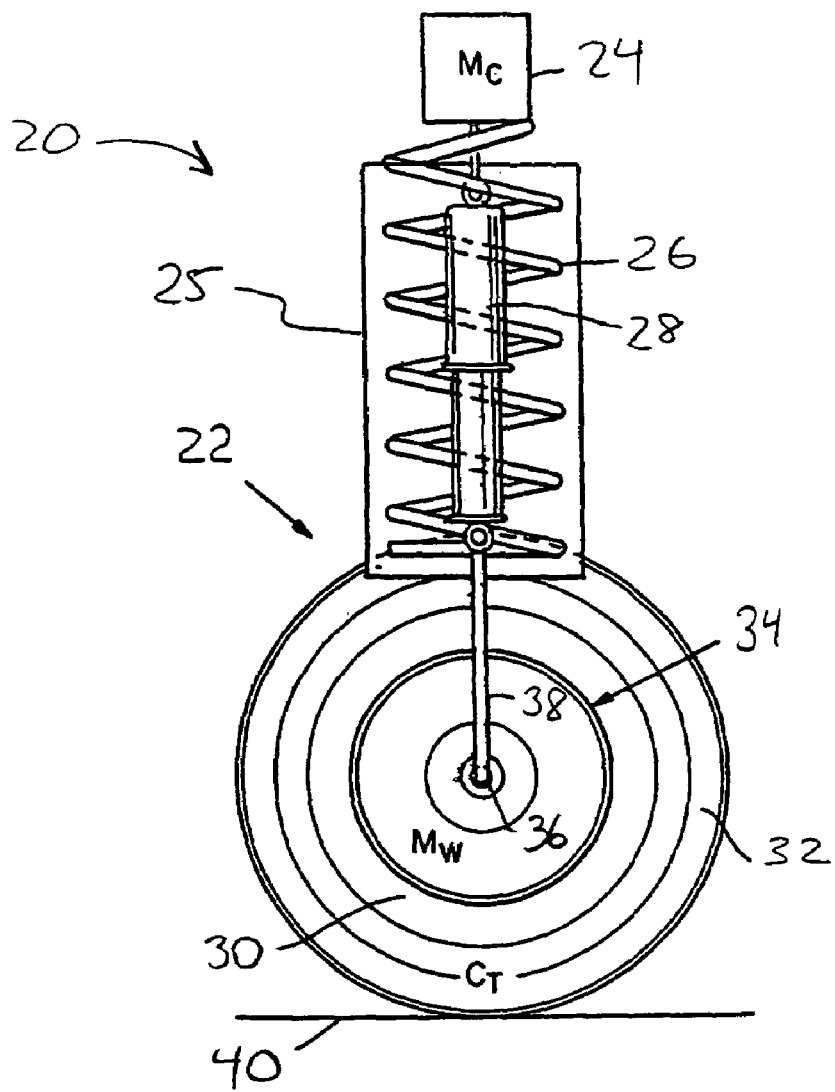
FIG. 1 is a combined block-diagrammatic representation of a vehicle wheel suspension.

Referring to FIG. 1, a suspension assembly 20 for a vehicle includes a wheel assembly 22 supporting the sprung mass 24 of the vehicle, typically about one-fourth the total mass of the vehicle, including the vehicle frame and components supported thereon (not shown). The sprung mass is connected to the wheel assembly by a spring-damper 25, which includes a spring element 26 coaxial with a shock absorber 28. Specifically, a wheel 30 includes a tire 32, and a hub 34 which is mounted for rotation about an axle 36. A wheel support assembly 38 connects the axle to the spring-damper assembly 25. The wheel assembly and wheel support assembly are characterized by an unsprung mass $M_w$. A brake assembly (not shown) can also be a component of the unsprung mass. The tire is shown supported by a road surface 40.

Figure 2:
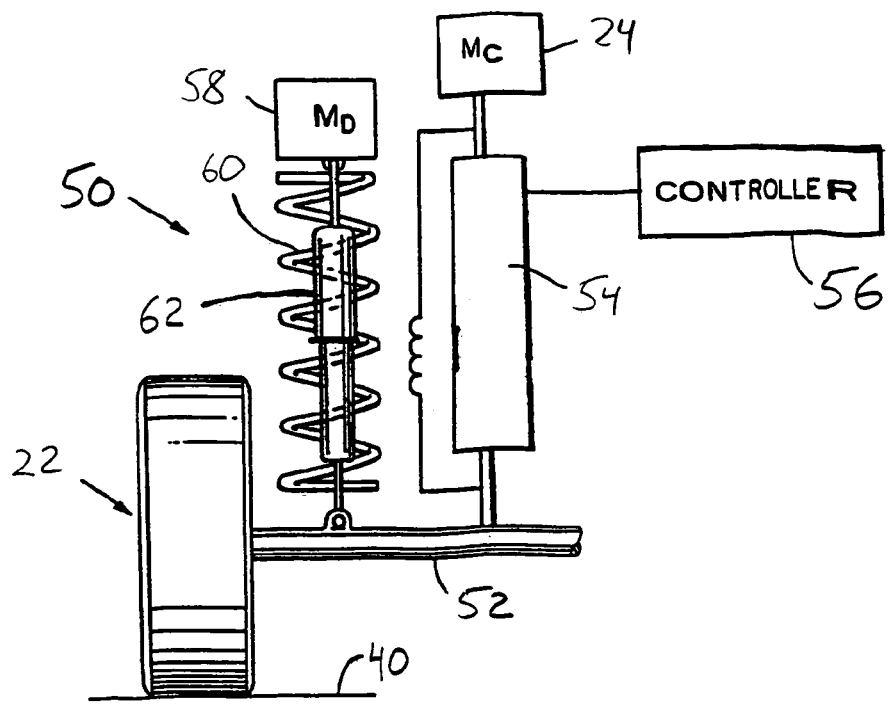
FIG. 2 is a combined block-diagrammatic representation of an active wheel assembly.

Referring to FIG. 2, an exemplary active vehicle suspension assembly 50 includes an electromechanical actuator and a damping assembly. The sprung mass 24 is connected to a wheel support assembly 52 by an active suspension actuator 54 which is controlled by electronic controller 56. A damping assembly including damping mass 58 connects to wheel support member with a damping spring 60 coaxial with clamping resistance element 62, which can be a shock absorber, for example.

Figure 3:
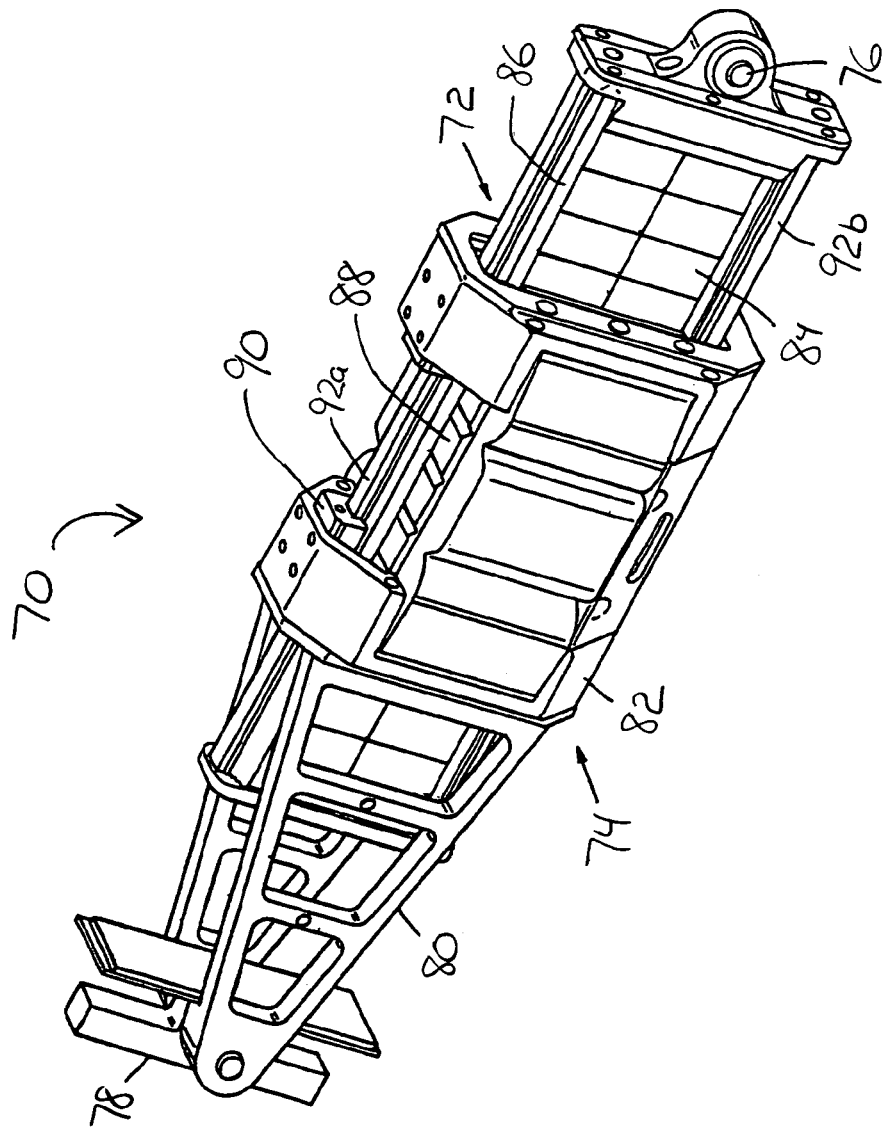
FIG. 3 is a perspective view of an electromechanical linear actuator.

Referring to FIG. 3, an example of an electromechanical actuator, a linear motor 70, is configured for the active suspension assembly 50 (FIG. 2). Such a suspension assembly is described in commonly owned U.S. Pat. No. 4,981,309, the contents of which are incorporated here by reference, as if fully set forth. The linear motor includes an inside member 72 which is slideably disposed within an outside member 74. An exposed end of the inside member includes a bushing 76 pivotally connected to the unsprung mass (not shown), such as a wheel assembly as described above, for example. The outside member is pivotally connected at an end opposite the bushing to support member 78 attached to the sprung mass, such as the vehicle frame, for example. An outside member mounting frame 80 is affixed to an outside member pole assembly 82 and includes coils 88. The inside member can include an array of rectangular magnets 84. The outside member can include linear bearings 90 that slideably engage bearing rails 92a, 92b to facilitate relative movement between the inner and outer members.

Figure 4A:
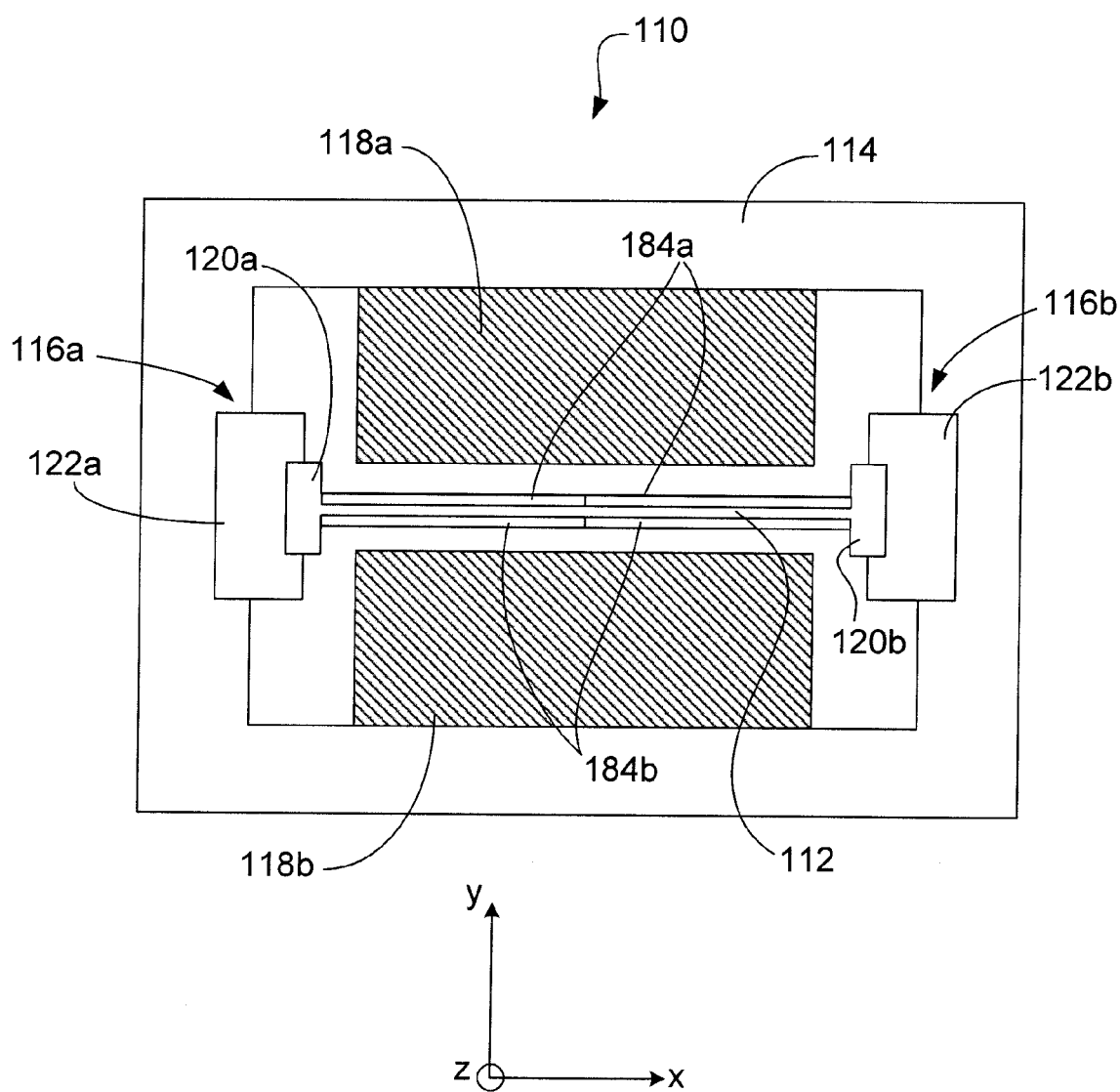
FIG. 4A is a schematic top view of an electromechanical actuator.

FIGS. 4A to 9 provide schematic top views of an electromechanical actuator such as the actuator depicted in FIG. 3, for example. Referring first to FIG. 4A, a bearing system 110 allows an armature 112 to slide freely in the Z-direction as indicated, relative to an outer case 114, along a linear bearing assembly 116a and 116b. The armature 112 can include magnets 184a, 184b, which can be an array of magnets 84 (FIG. 3) as described above. In one example, the armature 112 is elongate, and defines a longitudinal axis which extends generally in the Z-direction. At the same time, the bearing system can provide for constrained movement or high stiffness in the Y-direction to prevent the armature from impacting a stator, such as stacks 118a and 118b, which can be coils 88 (FIG. 3) as described above. The armature is attached to a pair of couplers. Couplers may comprise numerous types of bearing assemblies. In one embodiment, each coupler comprises a linear bearing rail and at least one bearing truck, where each coupler for example is attached at opposite ends of the armature. In other embodiments one or more couplers may comprise other bearing assembly types, such as roller bearings or magnetic bearings.

The couplers permit the armature 112 to slide freely relative to the outer case 114 along a first direction (such as Z-direction as indicated), while limiting the relative movement of the armature 112 and the outer case 114 along a second direction (such as Y-direction as indicated). In one embodiment, the bearing rails are attached to the armature and the bearing trucks are attached to the stator. In another embodiment, bearing trucks are attached to the armature and bearing rails are attached to the stator. In some embodiments, couplers are fixedly attached to the stator (or the case housing the stator), such that motion of the armature in the X direction is constrained. In other embodiments, one of the couplers is attached to the stator or stator housing in a manner that allows some degree of relative motion between the coupler and the stator in the X direction to occur.

Figure 4B:
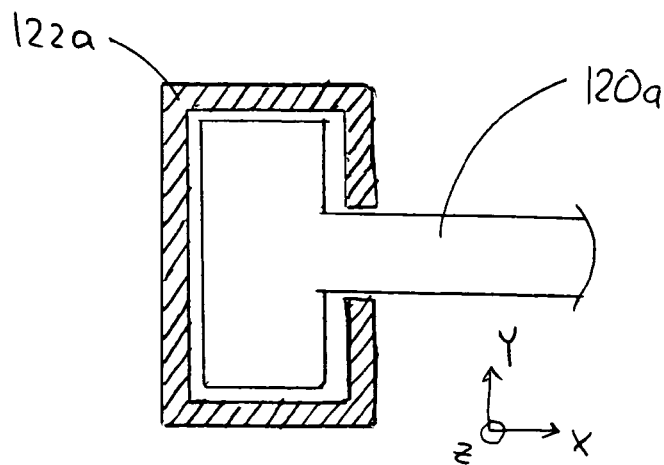
FIG. 4B is a detail view of a linear bearing depicted in the actuator of FIG. 4A.

FIG. 4B shows the detailed view of how armature 112 engages the bearing truck 122a, which applies to the discussion of all following relevant figures. Specifically, with reference to FIG. 4B, the left side of the armature is attached to linear bearing rail 120a using screws 111. The bearing rail 120a engages a bearing truck 122a which is rigidly attached to the case 114 using screws 121. The armature slides freely in the Z-direction.

Back to FIG. 4A, on the right side of armature, a linear bearing rail 120b engages a bearing truck 122b and slides freely in the Z-direction. Bearing trucks 122a, 122b can be rigidly attached to case 114 and contain ball-bearing assemblies to allow for free relative motion in the Z-direction between the each rail and the corresponding truck.

If the bearing trucks are both rigidly mounted to case as depicted in FIG. 4A, then the mechanical assembly includes more constraints than required for dynamic equilibrium and is overconstrained in the X-direction. Unless the case and armature are machined with equally matched tolerances, the constraints will load the armature in either tension or compression along the X-direction. By careful design of the armature and case it is possible to purposely apply force to the armature 112, thereby placing the armature in either tension or compression. Depending upon the application, such a design might be desirable. For example, placing armature in tension in the X-direction can increase the perceived stiffness of armature in the Y-direction, reducing the potential of the armature impacting the stacks 118a, 118b. Placing armature into tension or compression also can increase the possibility of friction within the bearing trucks when the armature is sliding in the Z-direction. In order to eliminate this source of friction, the overconstraint in the X-direction can be reduced.

Figure 5:
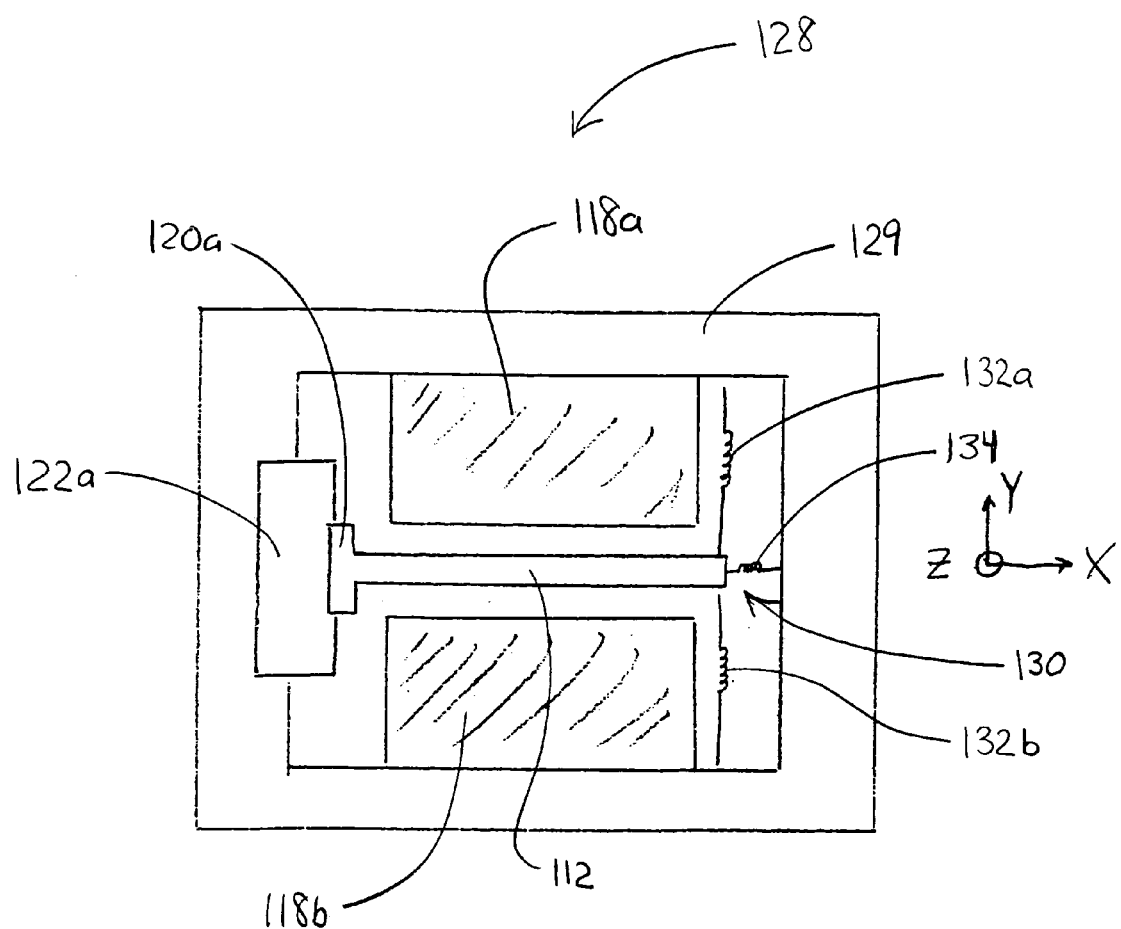
FIGS. 5 and 6 are schematic top view of view of an electromechanical actuator.

Referring to FIG. 5, a bearing system 128 can address the overconstraint condition with modifications to the right-side bearing system, but it should be understood that similar modifications could be made to the left-side bearing system or both the right and left-side bearing systems. The armature 112 is allowed to slide freely in the Z-direction relative to the case 129. A right-side bearing 130 can provide for free motion in the Z-direction, high stiffness in the Y-direction, and low stiffness in the X-direction. Biasing elements 132a and 132b are elements providing high stiffness in the Y-direction and biasing element 134 is an element providing low stiffness in the X-direction. In practice, it is possible to implement these biasing elements with a variety of devices including mechanical components, such as springs, magnetic components, and/or an air bearing system.

Figure 6:
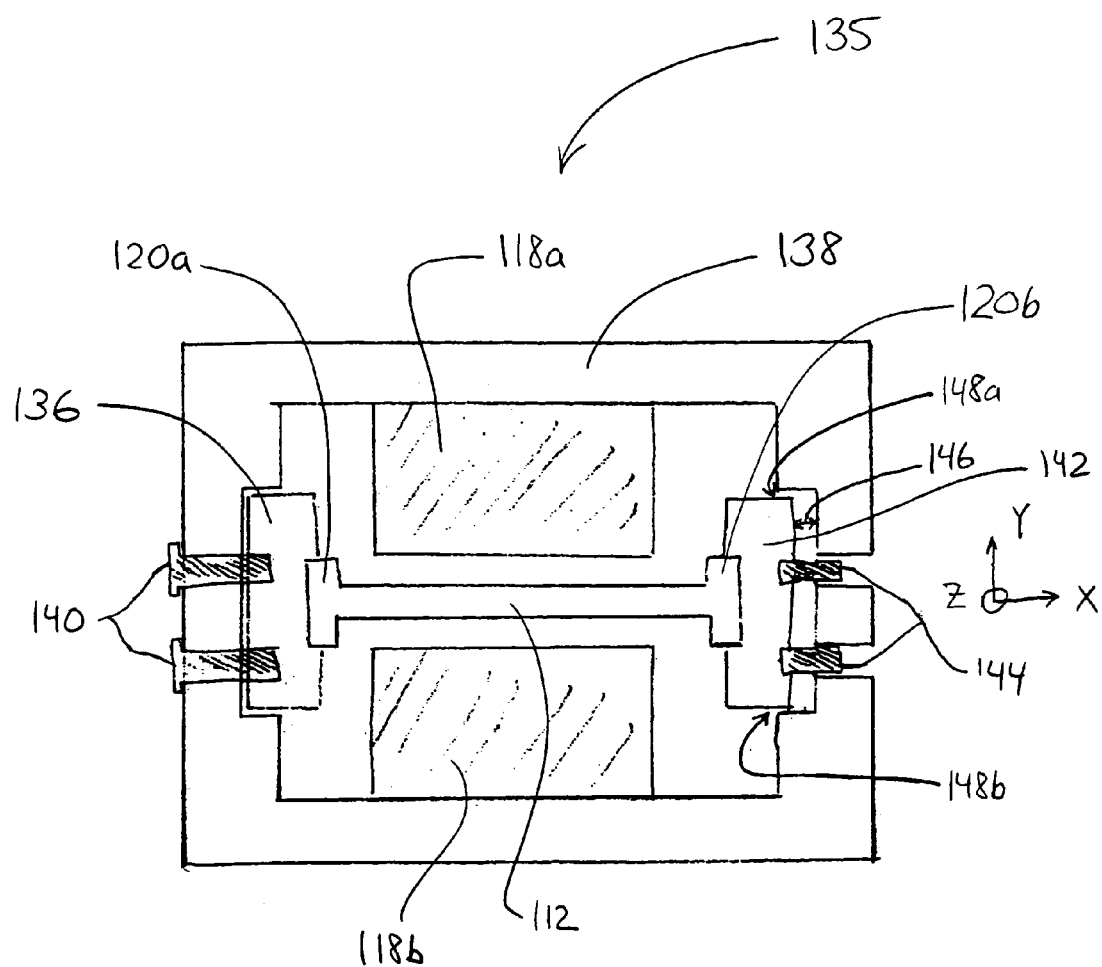

Another example of a bearing system 135 is shown in FIG. 6, including a left-side bearing truck 136 shown rigidly attached to a case 138 using screws 140. A right-side bearing truck 142 is shown "floating" relative to the case 138 using set-screws 144. By appropriately designing the width of the case 138 and the width of the armature 112, a predetermined gap 146 can be established between the case 138 and the bearing truck 142. Designing bearing truck pockets 148a, 148b to be slightly oversized relative to bearing truck 142 establishes stiffness along the Y-direction. As the movement of the right-side bearing is constrained in the Y-direction but is permitted along the X-direction, this assembly provides for substantially high stiffness in the Y-direction and substantially no stiffness in the X-direction. As such, the overconstraint condition is addressed and the movement of the armature 112 in the Z-direction in substantially unrestricted.

Figure 7B:
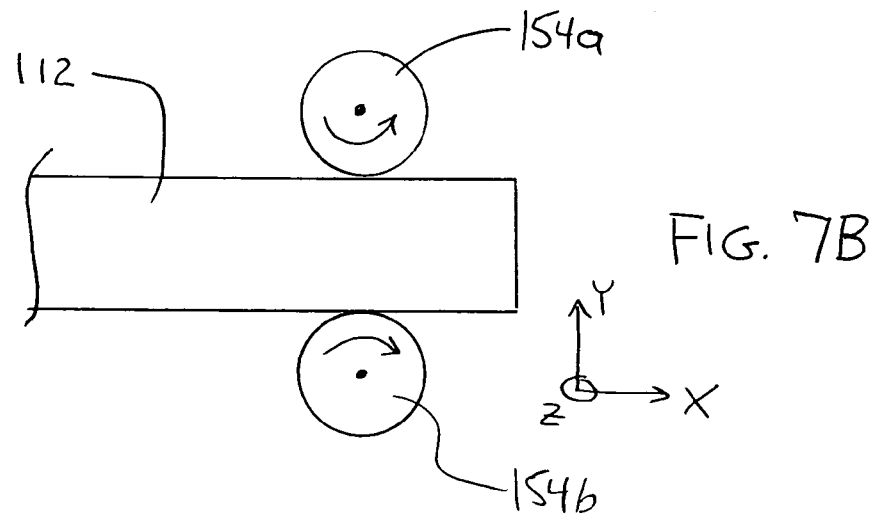
FIG. 7B is a detail view of a linear bearing depicted in the actuator of FIG. 7A.
Figure 7A:
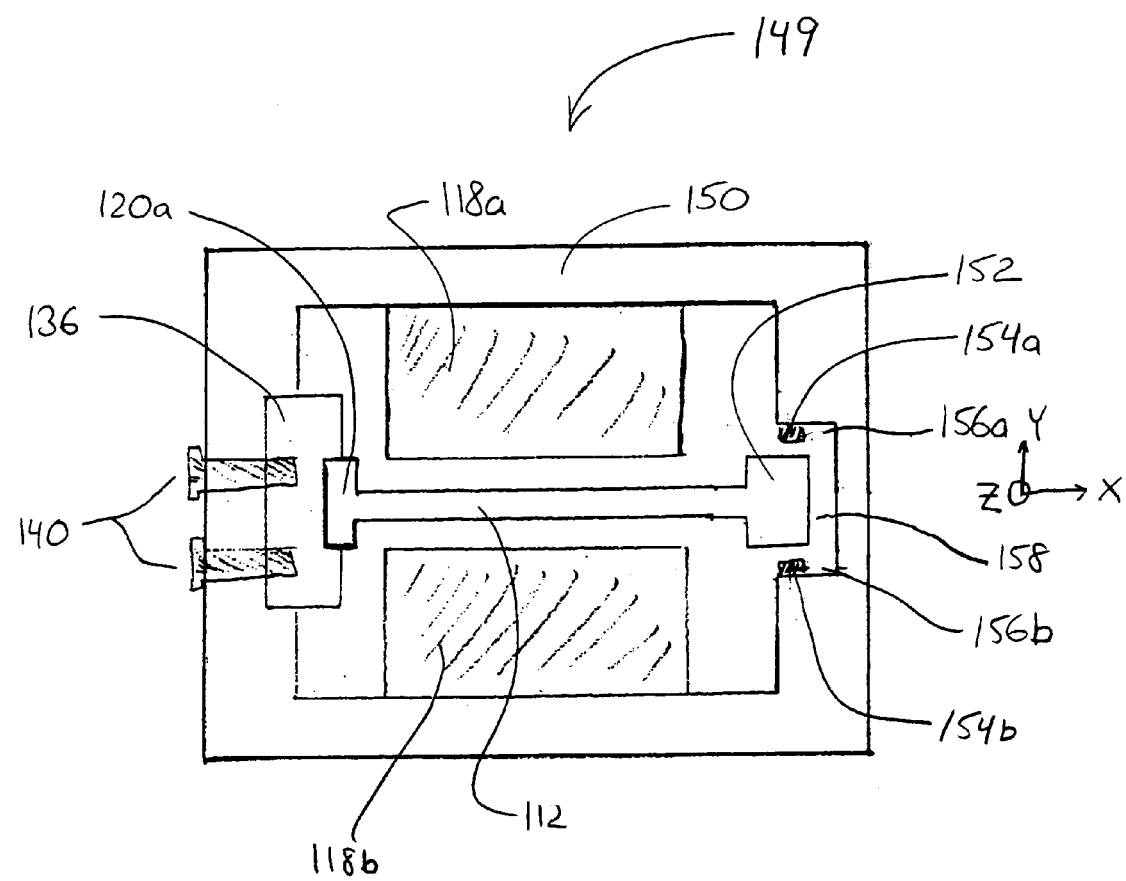
FIG. 7A is a schematic top view of an electromechanical actuator.

In another implementation, a bearing system 149 shown in FIG. 7A, includes the left-side bearing truck 136 rigidly attached to a case 150 using screws 140. The right-side bearing assembly includes a bearing surface 152 connected to the right side of the armature 112. To prevent the armature 112 from contacting stacks 118a and 118b, while moving in the Z-direction, roller bearings 154a, 154b may be used. FIG. 7B illustrates further details of the engagement of the armature 112 and the roller bearings 154a, 154b and the movement of the armature 112 along the Z-direction. To achieve high Y-direction stiffness, bearing pockets 156a, 156b are designed to be at least slightly larger than the thickness of armature 112 plus the thickness of the roller bearings 154a, 154b. Referring back to FIG. 7A, a gap 158 can be established between the side surface 151 of case 150 and the side surface 153 of the right-side bearing assembly which significantly reduces stiffness in the X-direction. As with the bearing assembly 135 of FIG. 6, this assembly provides for substantially high-stiffness in the Y-direction and substantially reduced or no stiffness in the X-direction. In one example, the left-side bearing assembly implemented by bearing truck 136 and bearing rail 120a provides enough stiffness in the Y-direction such that the right-side bearing assembly does not need to provide any additional stiffness for the armature. In this example, roller bearings 154a, 154b can be eliminated.

Figure 8B:
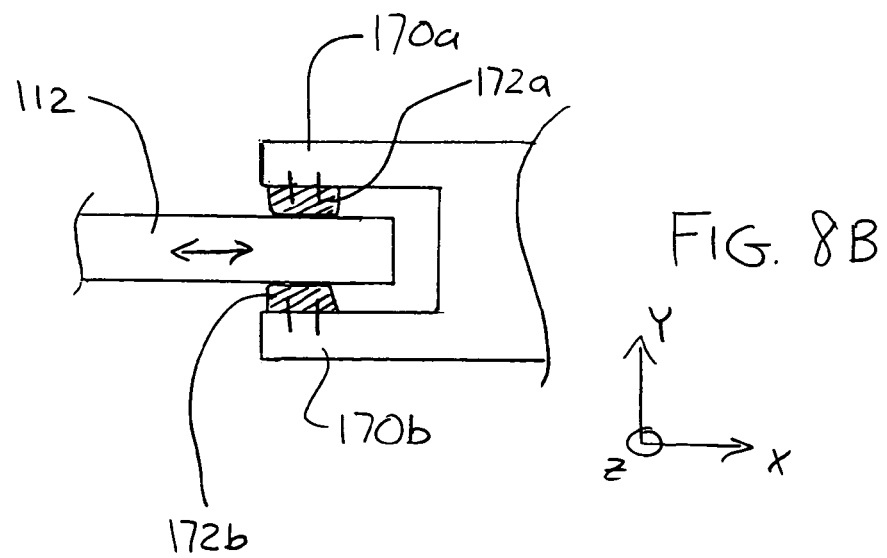
FIG. 8B is a detail view of a linear bearing depicted in the actuator of FIG. 8A.
Figure 8A:
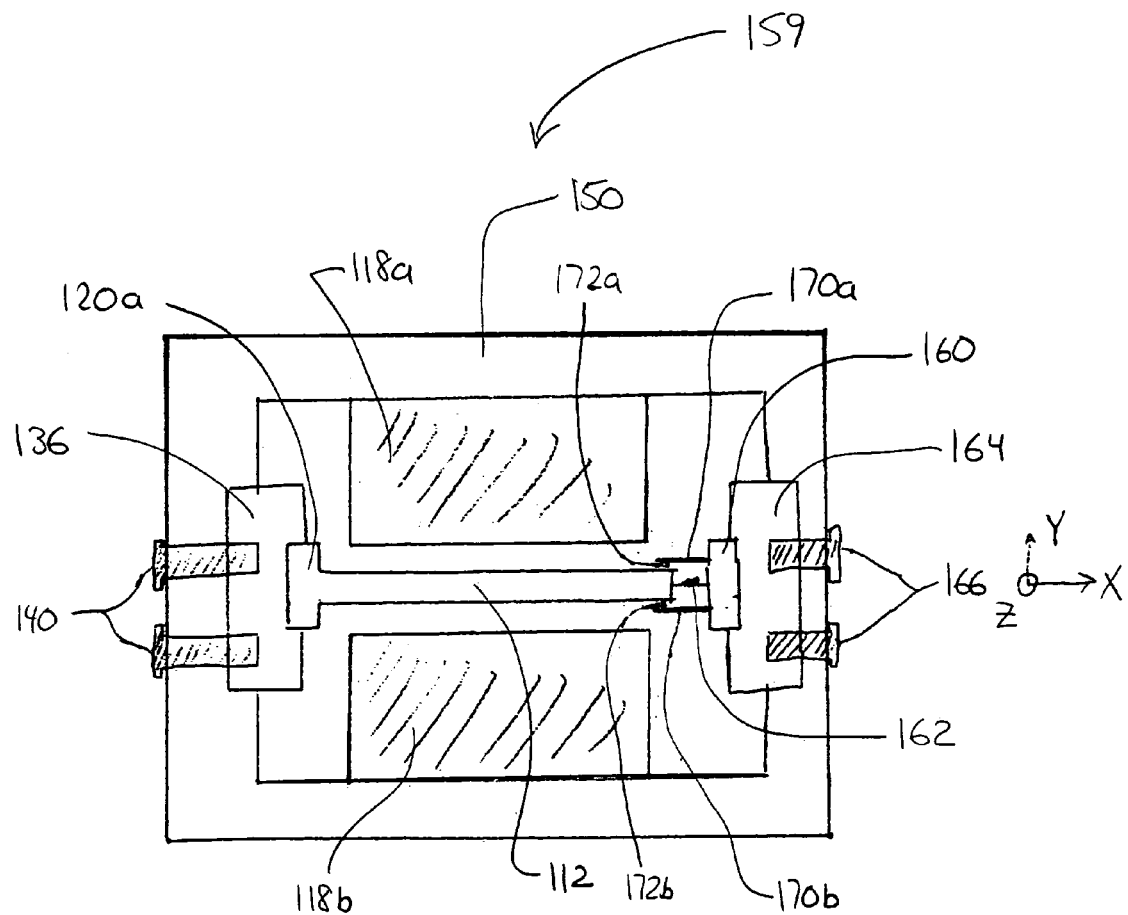
FIG. 8A is a schematic top view of an electromechanical actuator.

In another example, a bearing system 159 shown in FIG. 8A, includes the left-side bearing truck 136 rigidly attached to a first portion of the case 150 using screws 140. A right end of the armature 112 is connected to a bearing rail 160 with a spring 162. Bearing truck 164 is then rigidly attached to case 150 using screws 166. By adjusting the stiffness of spring 162, it is possible to adjust the level of friction that develops when armature 112 slides in the Z-direction. Spring 162 can represent the compliance of armature 112 and not be a physically separate element. Guides 170a, 170b can be used to provide additional stiffness in the Y-direction. In one example, as shown in FIG. 8B, low-friction blocks 172a, 172b such as delryn retainers, for example, are rigidly attached to the guides 170a and 170b to provide substantially high-stiffness in the Y-direction and substantially no stiffness in the X-direction between guides 170 and armature 112.

Figure 9:
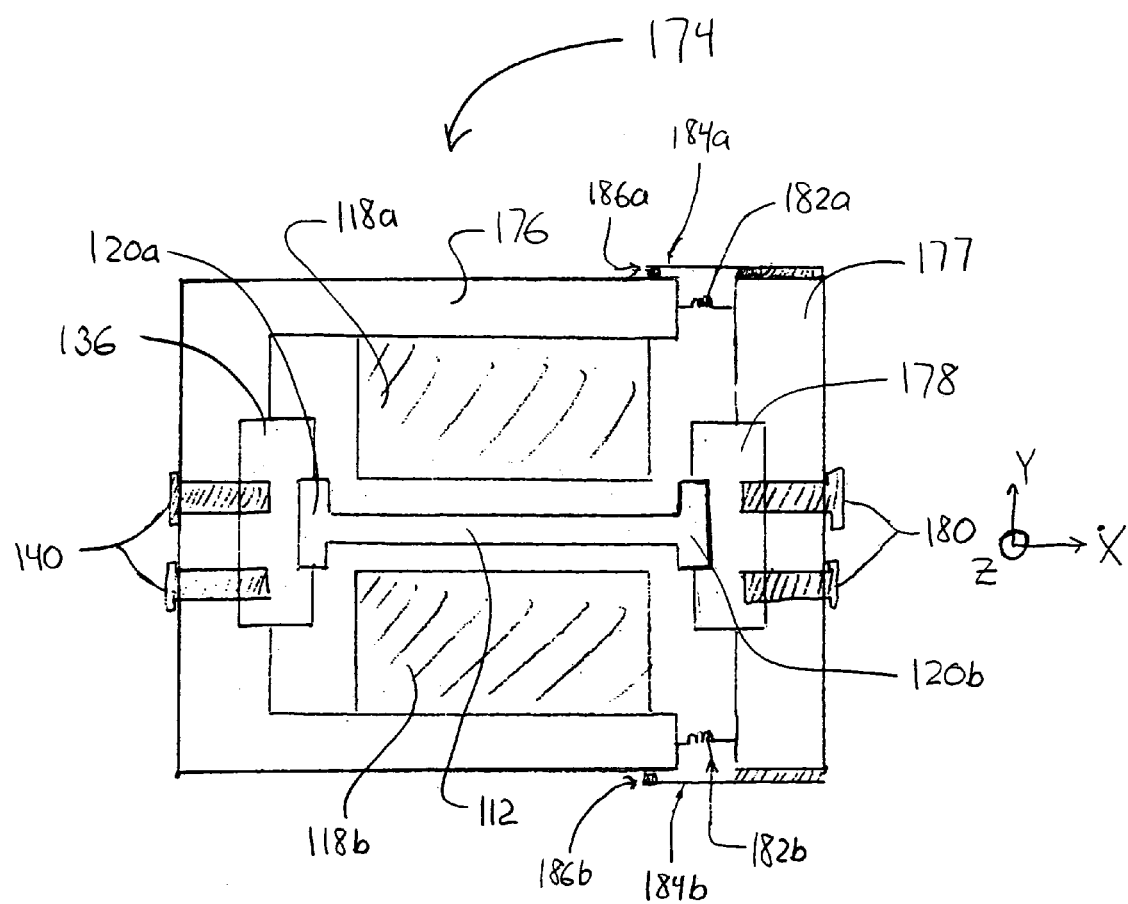
FIG. 9 is an axial sectional view of a bearing system embodiment.

In another example, a bearing system 174 shown in FIG. 9, includes the left-side bearing truck 136 rigidly attached to a left case-half 176 using screws 140. Similarly, right-side bearing truck 178 is shown rigidly attached to a right case-half 177 using screws 180. Compliance in the X-direction is provided by springs 182a, 182b extending between the left and right case-halves 176, 177. Springs 182a, 182b can represent the compliance of the case-halves and not be physically separate components. Guides 184a, 184b and low friction blocks 186a, 186b such as delryn retainers, for example, can be provided for additional Y-direction stiffness.

Figure 10:
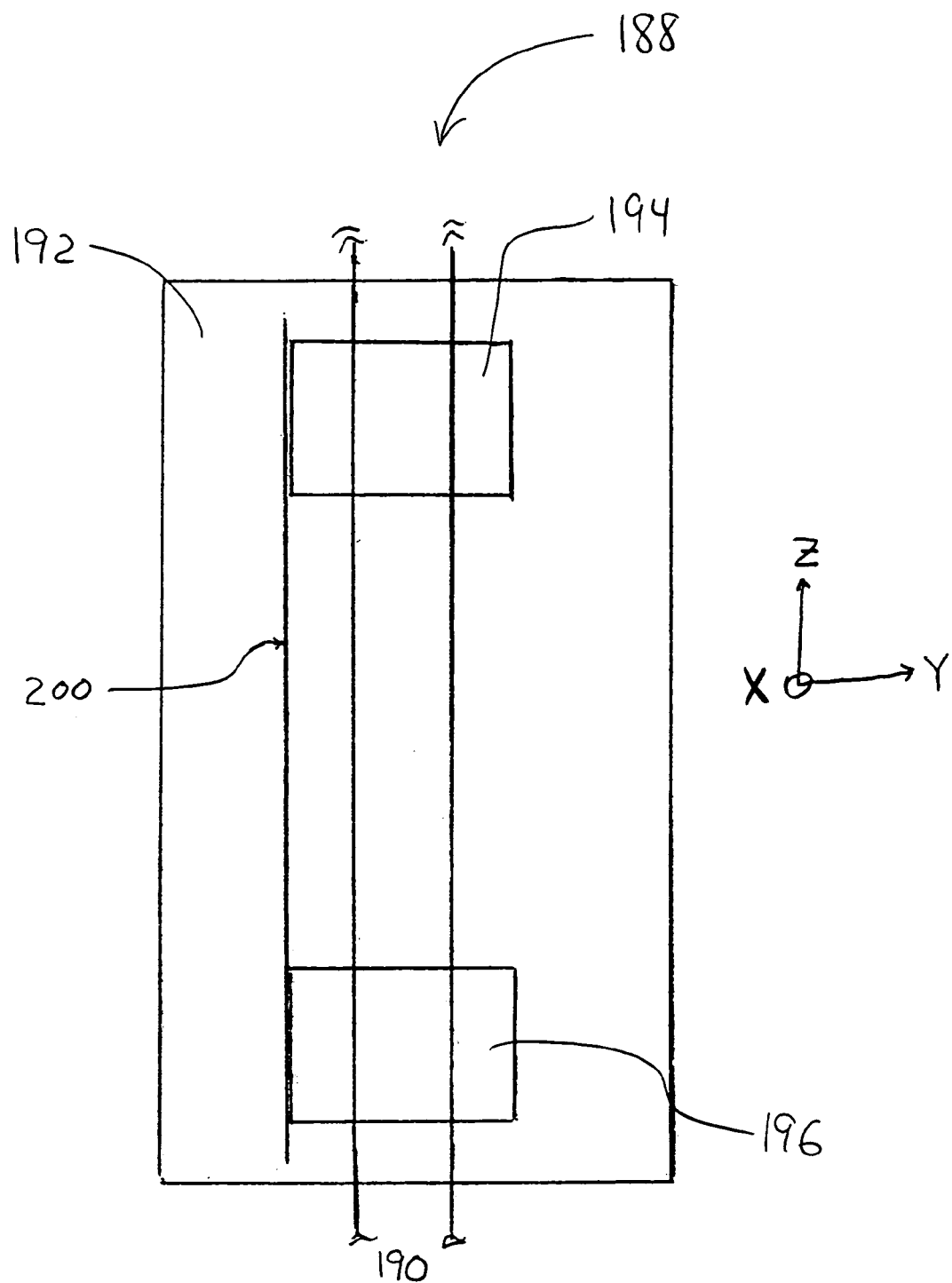
FIG. 10 is a schematic side view of an electromechanical actuator.

Without loss of generality, it should be understood that more than one bearing truck can be provided to engage the bearing rail extending along the Z-direction to provide additional stiffness in the Y-direction. Referring to FIG. 10, for example, a bearing system 188 includes a bearing rail 190 which slides in the Z-direction relative to case 192. Bearing trucks 194 and 196 can represent either left-side or right-side bearings in the descriptions of FIGS. 1 through 6. As such, bearing trucks 194, 196 can be either fixed to the case 192 or floating relative to the case. In the bearing system 188, bearing trucks 194, and 196 can be aligned in the Z-direction. This is accomplished using reference surface 200 (which forms one side of the bearing pocket). Reference surface 200 could be machined in one operation so as to guarantee the alignment of the two trucks.

Figure 11:
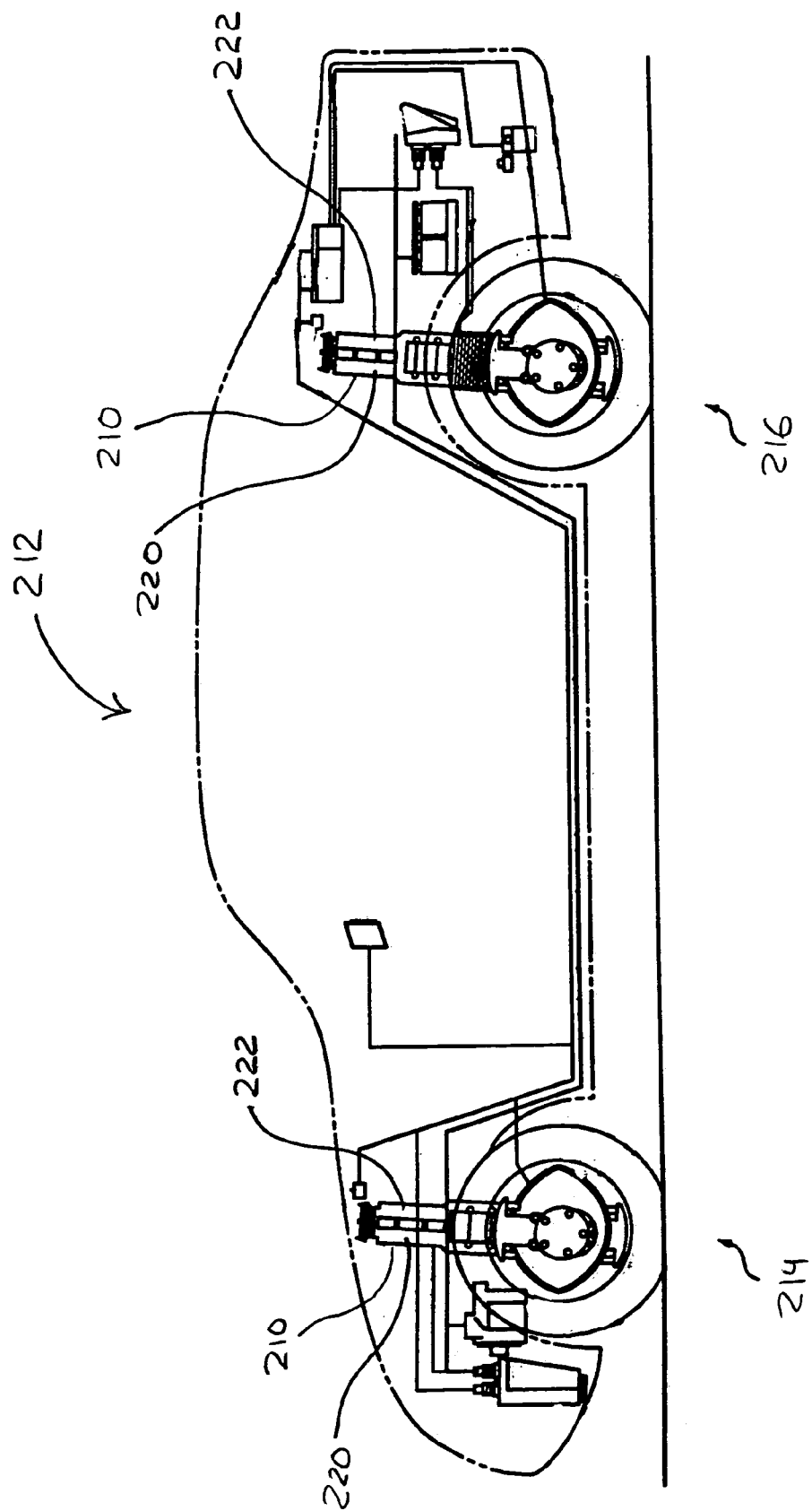
FIG. 11 is an overall view of active vehicle suspension system.

Referring to FIG. 11 and in one example, the actuators 210 form part of an integrated and active suspension control system for a vehicle 212. Actuators 210 are integrated at each wheel of the front and rear suspension systems 214, 216, respectively, of the vehicle as described with reference to FIG. 2. The actuators 210 can form part of the structural suspension linkage connecting the wheel assembly to the vehicle frame. The load capacity of the actuators 210 is asymmetric in that the load of the bearing is stronger in compression than in tension in a fore-aft direction. The dynamic loads applied to the bearings by the vehicle are asymmetric in that the applied loads are substantially greater during braking than acceleration. The actuators can be positioned within the vehicle to match the asymmetry in the load capacity of the bearing with the asymmetry in the applied loads of the vehicle. In one example, a first side of the actuator 220 including a fixed or rigidly attached bearing truck, such as the left-side bearing truck 136 (FIG. 6) is positioned toward the front of the vehicle and a second side of the actuator 222 including a floating bearing truck, such as the right-side bearing truck 142 (FIG. 6) is positioned toward the rear of the vehicle.

A number of embodiments of the invention have been described. Nevertheless, it will be understood that various modifications may be made without departing from the spirit and scope of the invention. For example, although the described applications for the bearing systems include active vehicle suspensions, other applications that require an electrically controllable relative force between sprung and unsprung masses, are contemplated. Accordingly, other embodiments are within the scope of the following claims.

What is claimed is:

1. An apparatus comprising:
a vehicle having an active suspension system, a chassis, and at least one wheel assembly,
the active suspension system comprising an electromagnetic transducer for providing a controllable force between the wheel assembly and the chassis and including a stator and an armature defining a first axis of motion and having first and second couplers, wherein the armature is driven to ride between the first coupler and the second coupler back and forth relative to the stator along the first axis;
the electromagnetic transducer oriented in the vehicle so that the first coupler is positioned towards the front of the vehicle and the second coupler is positioned towards the rear of the vehicle, the first and second couplers comprising fixed and floating bearing trucks respectively,
wherein the second coupler is configured to permit movement of the armature along a second axis, wherein the second axis is orthogonal to the first axis; and
wherein the armature comprises a magnet.

2. The apparatus of claim 1 further comprising an outer case having a first portion and a second portion.

3. The apparatus of claim 2 wherein the armature comprises first and second ends, the armature being configured to be slidably disposed within the case along the first axis.

4. The apparatus of claim 3 wherein the first coupler is configured to couple the first end of the armature with the first portion of the case and the second coupler is configured to couple the second end of the armature with the second portion of the case.

5. The apparatus of claim 4 wherein the second coupler is configured to impart high stiffness to the armature along a third axis, orthogonal to both the first axis and the second axis.

6. The apparatus of claim 3 wherein the first coupler comprises a first linear bearing rail attached to a first end of the armature and a first bearing truck affixed to a first portion of the case.

7. The apparatus of claim 6 wherein the first bearing rail is slideably disposed in the first bearing truck.

8. The apparatus of claim 6 wherein the first bearing truck is aligned with the first end of the armature along a surface substantially parallel to the first axis.

9. The apparatus of claim 3 wherein the first coupler comprises a first linear bearing rail and a first bearing truck.

10. The apparatus of claim 3 wherein the second coupler comprises a second linear bearing rail attached to the second end of the armature, and a second bearing truck disposed within the second portion of the case.

11. Apparatus in accordance with claim 1 wherein the load on said fixed bearing truck when the vehicle is braking is greater than on said floating bearing truck when said vehicle is accelerating.

* * * * *

UNITED STATES PATENT AND TRADEMARK OFFICE
CERTIFICATE OF CORRECTION

PATENT NO. : 7,654,540 B2  Page 1 of 1
APPLICATION NO. : 10/871230
DATED : February 2, 2010
INVENTOR(S) : Parison et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 629 days.

Signed and Sealed this

Twenty-eighth Day of December, 2010

David J. Kappos
*Director of the United States Patent and Trademark Office*